United States Patent [19]

Giroux

[11] Patent Number: 5,341,213
[45] Date of Patent: Aug. 23, 1994

[54] ALIGNMENT OF RADIATION RECEPTOR WITH LENS BY FOURIER OPTICS

[75] Inventor: Brian W. Giroux, Hampstead, N.H.

[73] Assignee: Avco Corporation, Providence, R.I.

[21] Appl. No.: 917,864

[22] Filed: Jul. 21, 1992

[51] Int. Cl.$^5$ .......................... G01B 11/00; G02B 5/18
[52] U.S. Cl. ...................................... 356/363; 356/356
[58] Field of Search ................................ 356/363, 356

[56] References Cited

U.S. PATENT DOCUMENTS

| | | | |
|---|---|---|---|
| 3,953,133 | 4/1976 | Jacoby | 356/363 |
| 4,142,797 | 3/1979 | Astheimer | 356/346 |
| 4,371,264 | 2/1983 | Lacombat et al. | 356/356 |
| 4,596,467 | 6/1986 | Bartelt | 356/363 |
| 4,646,142 | 2/1987 | Levine | 358/50 |
| 4,659,226 | 4/1987 | Elabd | 356/401 |
| 4,664,524 | 5/1987 | Hattori et al. | 356/401 |
| 4,672,676 | 6/1987 | Linger | 382/8 |
| 4,676,649 | 6/1987 | Phillips | 356/401 |
| 4,728,193 | 3/1988 | Bartelt et al. | 356/356 |
| 4,812,042 | 3/1989 | Yokokura et al. | 356/348 |
| 4,857,744 | 8/1989 | Kataoka et al. | 250/548 |
| 4,881,815 | 11/1989 | Sommargren | 356/363 |
| 4,891,526 | 1/1990 | Reeds | 250/442.1 |
| 4,928,392 | 5/1990 | Nomura et al. | 356/401 |
| 5,004,348 | 4/1991 | Magome | 356/401 |

FOREIGN PATENT DOCUMENTS

| | | | |
|---|---|---|---|
| 107529 | 4/1989 | Japan | 356/363 |
| 2281611 | 11/1990 | Japan | 356/363 |
| 4188608 | 7/1992 | Japan | 356/363 |

Primary Examiner—Robert J. Warden
Assistant Examiner—Ramon Torres
Attorney, Agent, or Firm—Perman & Green

[57] ABSTRACT method and apparatus for aligning a photoreceptor, such as a CCD array, at a back focal plane of a lens, as may be employed in the construction of a sensor of an imaging system, employs a pair of sine-wave gratings arranged perpendicularly to each other and disposed in front of the lens. An illuminating beam of collimated monochromatic light propagates through the gratings and the lens to form a two-dimensional diffraction pattern on the photoreceptor. Beam splitting optics are employed between a source of the illuminating beam and the gratings to split the illuminating beam into a first beam and a second beam which are inclined equally to an optical axis of the lens to produce two of the foregoing diffraction patterns offset from each other in a resulting composite diffraction pattern. Elements of the pattern undergo displacement from their correct positions in response to a tilting and/or displacement of the photoreceptor from its correct position and orientation in the back focal plane. The configuration of the diffraction pattern with the elements in their correct positions may be referred to as a reference pattern. Deviations of the diffraction pattern from the reference pattern indicate the requisite movements of the photoreceptor to accomplish alignment.

14 Claims, 5 Drawing Sheets

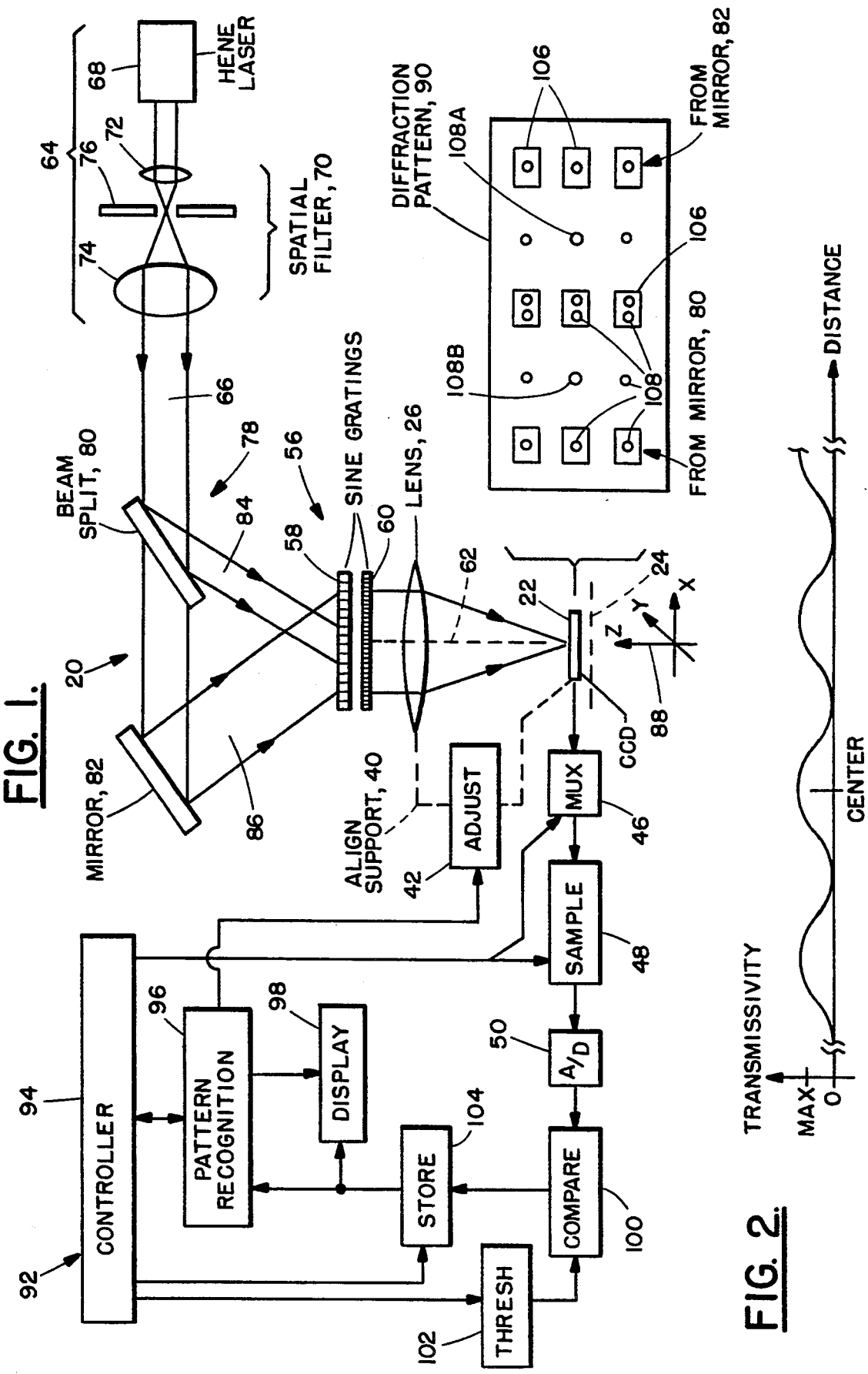

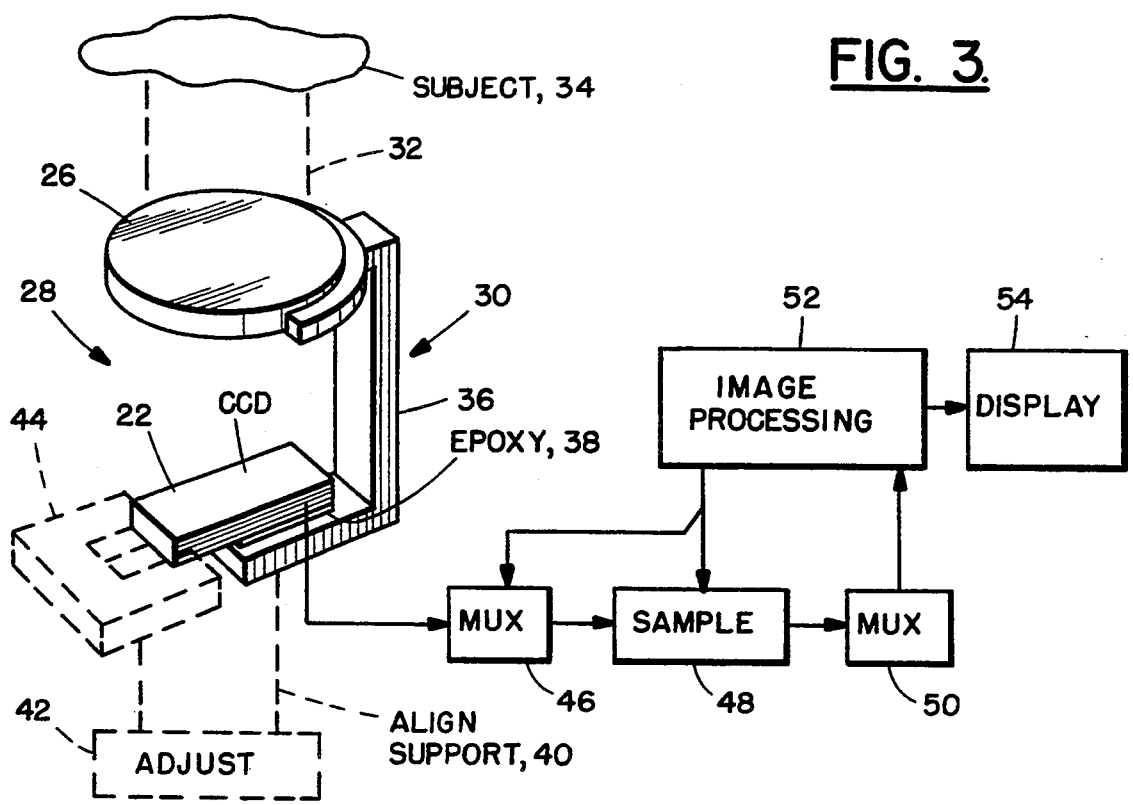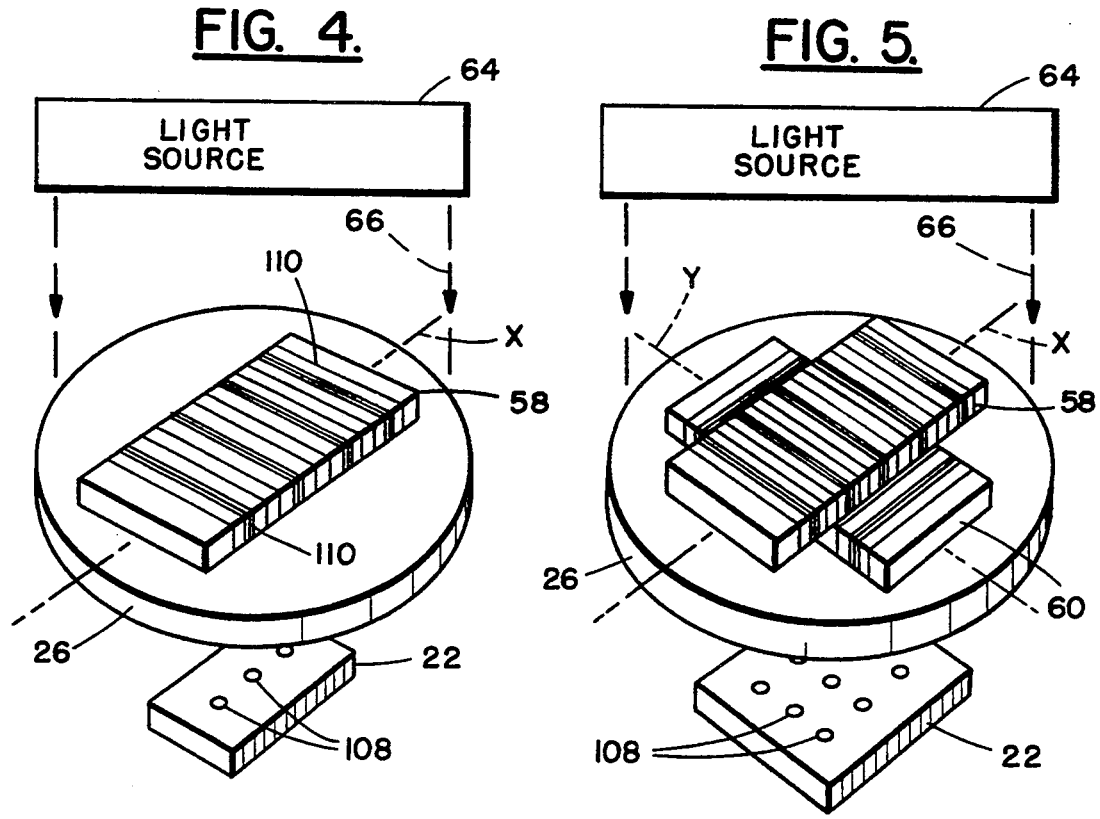

ALIGNMENT OF RADIATION RECEPTOR WITH LENS BY FOURIER OPTICS

BACKGROUND OF THE INVENTION

This invention relates to alignment of a radiation receptor element, such as a CCD photodetector array, behind a lens as in a sensor of an imaging system, wherein the lens directs rays of radiation to the radiation receptor element and, more particularly, to the alignment of an array of photodetectors by use of a sine wave grating located adjacent the lens to produce a multiple-peak diffraction pattern in a back focal plane of the lens, wherein the peaks serve as benchmarks for locating the photodetectors. Electronic imaging systems are frequently constructed of an array of radiation-sensitive elements, such as photodetectors, located behind a lens, at the back focal plane of the lens. Rays of radiation from a distant subject propagate towards the lens, and are focused by the lens upon the array of photodetectors. The photodetectors output electrical signals in response to the incident radiation. The electrical signals are processed, typically, by use of multiplexing and scanning circuitry which collects and samples the signals for further image processing, which may include filtering and storage for later use, such as for displaying an image of the subject. In order to display a sharp image of the subject, it is important that the photodetectors be positioned accurately in the focal plane of the lens.

A problem arises in that the need for accurate positioning of the photodetectors produces a burden in a process of manufacturing an imaging system. By way of example of such manufacture, the array of photodetectors may be fabricated as a CCD (charge coupled device) array configured as a CCD module. For a large array, a plurality of the CCD modules can be located contiguous each other. Alignment of a CCD module in respect to the lens has been accomplished by use of a microscope and a reticle to align the CCD module to reference pins. The CCD module is then coupled to the lens via the reference pins. The alignment has been accomplished about two perpendicular coordinate axes, X and Y, in the focal plane, and has included rotation about a Z axis perpendicular to the focal plane. Preferably, the alignment should make provision for translation about three perpendicular coordinate axes and rotation, or tilting, about the three perpendicular coordinate axes. A supporting structure of the imaging system supports both the CCD module and the lens in their respective positions. The foregoing alignment process has required removal of the lens from the supporting structure. The alignment also provides for adjustment of the CCD module in the Z direction so that, upon inserting the lens in its place in the supporting structure, the CCD module is located properly in the back focal plane.

In the foregoing example of an alignment process, a flange of the lens has been used as a reference plane for alignment in the Z direction. However, in the event that there are variations of focal length between lenses wherein the variation is bigger than a depth of focus of each lens, then the position of the CCD module may not be optimum upon replacing one lens with another lens. Furthermore, since the foregoing alignment process has been accomplished with the lens removed from the supporting structure, there is a possibility that an optical axis of the lens may not be truly perpendicular to the front face of the CCD module due to lens aberrations or machining tolerances in the flange of the lens.

SUMMARY OF THE INVENTION

The aforementioned problems are overcome and other advantages are provided by a method and apparatus, in accordance with the invention, for aligning a light-receiving element, or a photoreceptor, with a back focal plane of a lens. As used herein, the term "photoreceptor" includes both (1) a passive-light receiving element such as a photographic plate, or even a sheet of paper, which enables a human observer to view a diffraction pattern at the back focal plane and (2) an active light-receiving element such as an array of photodetectors emitting electrical signals to an electronic imaging system in response to incident light. In the practice of the invention, the term "light" includes radiation from portions of the electromagnetic spectrum suitable for diffraction such as infrared, visible, and ultraviolet radiation. The invention is well suited for alignment of photoreceptive charge-coupled devices (CCD's) arranged in the array of a sensor of an imaging system, wherein the sensor includes a lens, and a frame or housing which supports the elements in front of the CCD array. By way of example, the invention would be employed during construction of a sensor to provide alignment. During the alignment process, a layer of epoxy is employed, in a preferred embodiment of the invention, to secure the CCD array to the frame to maintain the alignment.

The invention is practiced by placing the photoreceptor in, or approximately in, the back focal plane of the lens, and by placing a grating assembly having a sine-wave grating in front of the lens. Thereupon, an illuminating beam of collimated monochromatic light, preferably of uniform cross-sectional intensity, illuminates the grating and is directed through the grating and the lens to illuminate the photoreceptor. The invention utilizes the Fourier transformation property of a lens to operate on the light transmitted via the grating to form a diffraction pattern in the back focal plane of the lens. The spacing between peaks of the radiation intensity is determined by the wavelength of the illuminating radiation, the fixed periodicity of the grating, and a spacing between the lens and the photoreceptor in accordance with a well-known grating equation. The optical transmissivity of the grating varies in a sinusoidal fashion with constant periodicity in a single dimension along an axis of the grating. The diffraction pattern is visible directly upon the photoreceptor, and may be employed by a person to align the photoreceptor in a manner to be described. In the case of an active photoreceptor, such as the foregoing CCD array, an electronic imaging system may be employed to view the diffraction pattern so as to obtain an indication of how the photoreceptor is to be repositioned and/or reoriented to accomplish the alignment.

In accordance with a feature of the invention, additional alignment data can be obtained by employing a grating assembly of two sine-wave gratings arranged with their respective axes, an X axis and a Y axis, perpendicular to each other. This provides a two-dimensional diffraction pattern. The available alignment data from the diffraction pattern is increased still further by employing beam-splitting optics, in accordance with a further feature of the invention, to split the illuminating beam into a first beam and a second beam which are inclined equally to an optical axis of the lens. This produces two of the foregoing diffraction patterns with the two diffraction patterns being offset from each other in a resulting composite diffraction pattern. In a preferred embodiment of the invention, the first beam, the second beam, and an axis of one of the gratings are coplanar so as to offset the two diffraction patterns in the direction of the X axis.

Elements of the composite diffraction pattern undergo displacements from their correct positions in response to a tilting and/or displacement of the photoreceptor from its correct position and orientation in the back focal plane. The configuration of the composite diffraction pattern with the elements of the pattern in their correct positions may be referred to as a reference diffraction pattern. A deviation in the configuration of the composite diffraction pattern from the reference pattern indicates the requisite movement of the photoreceptor to accomplish alignment.

Electronic processing of the diffraction pattern may be accomplished by connecting an imaging system to the CCD array, and by operating the imaging system to establish windows about the locations of the elements of the reference diffraction pattern. In addition, signals received from the CCD's providing pixels for each of the windows is applied to threshold circuitry to enable viewing of only such portions of the composite diffraction pattern which exceed the threshold in each of the windows. Displacement of elements of the composite diffraction pattern from the centers of respective windows provides data as to a direction of rotation or tilt, and a direction of displacement of the CCD array to align the CCD array in the back focal plane of the lens.

BRIEF DESCRIPTION OF THE DRAWING

The aforementioned aspects and other features of the invention are explained in the following description, taken in connection with the accompanying drawings wherein:

FIG. 1 is a diagrammatic view of a system for aligning a CCD array with a lens by use of a grating assembly in accordance with the invention;

FIG. 2 shows an optical transmissivity characteristic of a sine-wave grating employed in FIG. 1;

FIG. 3 is a diagrammatic view of an imaging system employing a sensor comprising a lens with a CCD array in alignment with the lens;

FIG. 4 is a stylized perspective view, partially diagrammatic, of a single sine-wave grating disposed in front of the lens of FIG. 1;

FIG. 5 is a stylized perspective view, partially diagrammatic, of two perpendicular sine-wave gratings disposed in front of the lens of FIG. 1;

DETAILED DESCRIPTION

Figure 6:
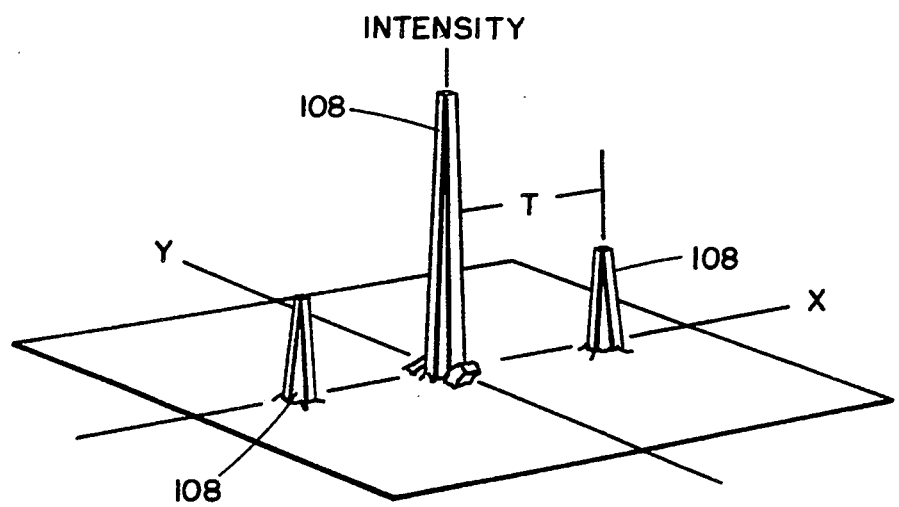
FIG. 6 shows a diffraction pattern obtained by the single grating of FIG. 4.

With reference to FIGS. 1-3, there is shown apparatus 20 (FIG. 1) for aligning a CCD array 22, or other form of radiation-receiving element, with a back focal plane 24 of a convex focusing lens 26. As shown in FIG. 3, the lens 26 is suitable for use in a sensor 28 of an imaging system 30 for focusing rays 32 from a subject 34 upon the CCD array 22. In the construction of the sensor 28, the CCD array 22 is located relative to the lens 26 by means of a frame 36 which is affixed to both the lens 26 and the CCD array 22. In accordance with the practice of the invention, attachment of the CCD array 22 to the frame 36 is accomplished by means of a layer of a suitable, mechanically-stable material, such as an epoxy layer 38. Initially, during the construction of the sensor 28, the CCD array 22 is held by an alignment support 40 (shown in FIGS. 1 and 3) operative with a mechanical adjustment device 42 which forms a part of the support 40. As indicated in phantom view in FIG. 3, the alignment support 40 connects between the frame 36 and the CCD array 22, with connection to the CCD array 22 being made by means of a yoke 44 constructed as part of the alignment support 40. The yoke 44 grips the CCD array 22 to enable adjustment of the position of the CCD array 22 for aligning the CCD array 22 with the back focal plane 24 of the lens 26 during construction of the sensor 28. Upon completion of the alignment procedure, the epoxy layer 38 is placed along an interface between the array 22 and the frame 36 to hold the array 22 in fixed relation to the frame 36 and to the lens 26. After the epoxy layer 38 has set, so as to be mechanically stable, the yoke 44 is disconnected from the array 22, and the alignment support 40 is removed from the array 22 and the frame 36.

As shown in FIG. 3, the imaging system 30 further comprises a multiplexer 46, a sampling unit 48, a converter 50 of analog signals to digital format, an image processing unit 52, and a display 54. In operation, the image-processing unit 52 provides command and timing signals to the multiplexer 46 and the sample unit 48 for extracting signals outputted by individual photodetectors of the CCD array 22 in response to incident radiation, such as visible, infrared, or ultraviolet light, from the subject 34. In well-known fashion, the multiplexer 46 selects and couples signals from the photodetectors of the array 22 to the sampling unit 48 which samples the signals and applies analog samples to the converter 50. The analog samples are converted by the converter 50 to multiple-bit digital samples for use by the image processing unit 52. The image-processing unit 52 includes well-known circuitry (not shown) such as filtering and data storage circuits for extracting imaging data from the digital samples to produce, on the display 54, an image of the subject 34. The quality of the image depends on the accuracy with which the CCD array 22 has been aligned at the back focal plane of the lens 26. The requisite alignment is accomplished with accuracy and in a facile manner by use of the invention as is described with reference to FIG. 1.

As shown in FIG. 1, the alignment apparatus 20 further comprises a grating assembly 56 having a first sine-wave grating 58 and a second sine-wave grating 60 disposed in front of the lens 26 on the side thereof opposite the location of the array 22 at the back focal plane 24. The sine-wave gratings 58 and 60, the lens 26 and the array 22 are disposed along a common optical axis 62 of the lens 26. Also included within the alignment apparatus 20 is a light source 64 which provides an illumination beam 66 of light for transmission via the grating assembly 56 and the lens 26 to the array 22. The light source 64, in a preferred embodiment of the invention, includes a helium-neon laser 68 for providing coherent monochromatic light which propagates through a spatial filter 70 of the source 64 to produce the beam 66. The filter 70 may be composed of binary optics and, by way of example, is portrayed diagrammatically by means of two convex lenses 72 and 74 disposed before and after a pin-hole aperture plate 76. The filter 70 is operative to provide uniform intensity across a cross-sectional region of the beam 66. By virtue of the filter 70, a Gaussian distribution of light intensity outputted by the laser 68 is converted to a uniform distribution of light in the beam 66.

In accordance with a feature of the invention, the alignment apparatus 20 further comprises a beam-splitting assembly 78 comprising a beam splitting, or partially-reflecting mirror 80 and a totally-reflecting mirror 82. A portion of the optical power of the illuminating beam 66 is extracted by the beam-splitting mirror 80, and is directed as a first inclined beam 84 to the grating assembly 56. The remaining optical power of the illuminating beam 66 is directed by the mirror 82 in the form of a second inclined beam 86 to the optical assembly 56. The partially-reflecting capacity of the beam-splitting mirror 80 is adjusted, in well-known manner, to equalize the optical power of the first and the second inclined beams 84 and 86. The orientations and the positions of the mirrors 80 and 82 are selected to incline the first and the second beams 84 and 86 equally with the optical axis 62 and on opposite sides of the optical axis 62. The use of the two beams 84 and 86 provides, in a preferred embodiment of the invention, maximum capability to the apparatus 20 for aligning the CCD array 22 with respect to displacement along any one of three orthogonal directions X, Y, and Z of a coordinate axes 88 as well as rotation (or tilt) about any one of the coordinate axes X, Y, and Z. If desired, a reduced capacity of alignment can be accomplished by illuminating the grating assembly 56 normally by a single beam, such as the illuminating beam 66, for providing a diffraction pattern upon the front surface of the array 22 facing the lens 26. The effect of the foregoing two forms of illumination of the gating assembly 56, as well as the effect of using only the first grating 58 as compared to use of both of the gratings 58 and 60 will be described with reference to FIGS. 4–8. In particular, it is noted that use of the two inclined beams 84 and 86 for illuminating the grating assembly 56, wherein the assembly 56 includes both of the gratings 58 and 60 in accordance with the preferred embodiment of the invention, provides the diffraction pattern 90 which is shown in enlarged view in FIG. 1. The diffraction pattern 90 is visible on the front surface of the array 22 when the array 22 is illuminated by the light of the visible portion of the electromagnetic spectrum.

The alignment apparatus 20 also includes an imaging system 92 to provide for automatic electronic processing of the diffraction pattern 90 to provide the capability of automatic operation of the mechanical adjustment device 42 for aligning the CCD array 22. The imaging system 92 includes the multiplexer 46, the sampling unit 48, and the analog-to-digital converter 50 described previously for the imaging system 30 of FIG. 3. The imaging system 92 of FIG. 1 further comprises a controller 94, a pattern recognition computer 96, a display 98, a comparator 100 coupled to an output terminal of the converter 50, a threshold unit 102 which provides a reference input signal to the comparator 100, and a memory 104 which stores data outputted by the comparator 100 for subsequent presentation upon the display 98. In the operation of the imaging system 92, digitized samples of the diffraction pattern 90 are provided by the converter 50 in the same fashion as has been described with reference to the imaging system 30 of FIG. 3 wherein the converter 50 provides digitized samples of an image of the subject 34. In FIG. 1, to facilitate an extraction of useful data from the diffraction pattern, only those samples outputted by the converter 50 which exceed a threshold provided by the unit 102 are placed in the memory 104. The comparator 100 provides the function of comparing the magnitude of the samples outputted by the converter 50 with the threshold. Operation of the sampling unit 48, the multiplexer 46, as well as the operations of the threshold unit 102, the memory 104, and the pattern-recognition computer 96 are controlled by the controller 94, the controller 94 providing a common time base for synchronizing the operations of these components of the imaging system 92.

The controller 94, which may be constructed as a computer, operates in conjunction with the pattern recognition computer 96 to establish windows 106 surrounding areas of interest of the diffraction pattern 90. Peaks 108 of radiation intensity are located at numerous sites within the diffraction pattern 90, but only selected ones of these peaks 108 are employed for the alignment process, the selected ones of the peaks 108 being located within the windows 106. For each of the windows 106, the controller 94 directs the threshold unit 102 to apply a preassigned value of threshold to the comparator 100. This increases the signal-to-noise ration (SNR) of the signal samples stored in the memory 104 for use in the alignment process.

Displacement of the CCD array 22 from its desired location along any one of the coordinate axes X, Y, or Z, as well as any rotation about any one of the coordinate axes X, Y, or Z introduces a distortion to the diffraction pattern 90 such that individual ones of the peaks 108 migrate from central portions of the respective windows 106 towards the edges of the windows 106. These migrations occur in a specific manner, depending on the nature of the displacement and/or rotation of the CCD array 22 relative to the coordinate axes 88. The pattern-recognition computer 96 is programmed, in a manner to be explained hereinafter, to recognize the pattern of migrations of the peaks 108 so as to generate corrective commands to the adjustment device 42 to reposition the CCD array 22 to accomplish the desired alignment. If desired, the windows 106 may be transmitted from the computer 96 to the display 98 to be superposed upon the presentation of the diffraction pattern 90, so that a person operating the alignment apparatus 20 can view more readily any distortion in the diffraction pattern 90 resulting from a lack of alignment of the CCD array 22 relative to the lens 26. This operation of the imaging system 92 can be explained most readily by considering first the construction of the sine-wave gratings 58 and 60, and the nature of the diffraction patterns produced by these gratings.

FIG. 2 shows a graph of the transmissivity of either one of the sine-wave gratings 58 and 60 to radiation produced by the laser 68. The transmissivity function resembles a sinusoid of constant frequency. The frequency, or wavelength, of the transmissivity pattern may be the same or different in the two gratings 58 and 60. Interaction of the radiation of the laser 68 with each of the gratings 58 and 60 to produce a diffraction pattern is dependent on the ratio of the wavelength of the radiation of the laser 68 to the periodicity of the sine wave pattern in respective ones of the gratings 58 and 60 in accordance with the well-known grating equation. The transmissivity varies from zero transmission, wherein the grating is essentially opaque, up to a maximum value wherein the grating is essentially transparent to the radiation.

Figure 7:
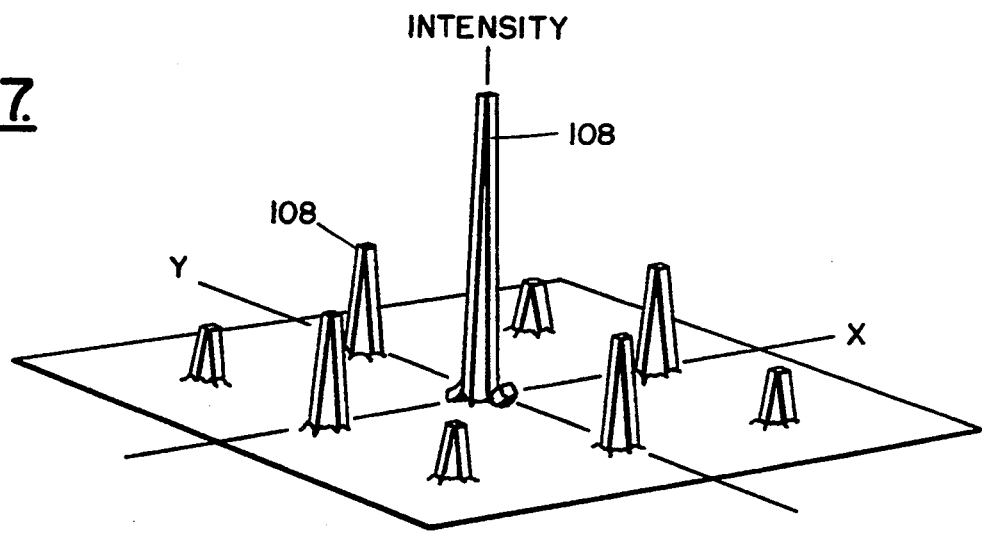
FIG. 7 shows a diffraction pattern obtained by the combination of the two gratings of FIG. 5.

FIGS. 4 and 6 show the effect of illuminating the CCD array 22 by directing the illumination beam 66 normally through a single grating, such as the grating 58 disposed in front of, and adjacent the lens 26. FIG. 4 shows, in a stylized view, the physical configuration of the sine-wave grating 58 by use of lines 110 which are spaced apart with increased distance to show reduced opacity and increased transmissivity of the grating 58, the lines 110 being positioned with reduced spacing to show greater opacity and reduced transmissivity of the grating 58. The grating 58 extends along the x axis with the opacity/transmissivity varying in quasi-sinusoidal fashion in the direction of the X axis. The transmissivity is uniform within a plane normal to the X axis. In a preferred embodiment of the invention, both of the gratings 58 and 60 are constructed in the same fashion, each grating comprising a transparent film, such as a photographic film, with regions of the film being made of increasing opacity, as is readily accomplished by exposing an undeveloped photographic film to light with the amount of exposure being varied to produce the sinusoidal variation in opacity. The sine wave of the grating 58, extending in a single dimension as shown in FIG. 4, produces, in cooperation with the lens 26, a radiation diffraction pattern, as shown in FIG. 6, upon the front face of the CCD array 22. The radiation pattern is characterized by a set of peaks 108 of radiation intensity arranged along the X axis. In FIG. 6, the shape of each peak 108 is described mathematically by the square of $\sin(x)/(x)$ wherein x is distance along the X axis. The central peak is the dc term, and the other two peaks correspond to the spatial frequency of the sine grating, one peak for the positive frequency and one peak for the negative frequency. The distance (T) between peaks, or separation between diffraction orders, is given mathematically by the product $WFG = T$ wherein W is the wavelength of the light of the illuminating beam 66, F is the focal length of the lens 62, and G is the grating frequency of the sine wave of the grating 58 (or 60) in cycles per millimeter. By way of example, for a focal length of 1.98 inch, a helium-neon laser outputting a wavelength of 633 nanometers, and wherein the pixels of the CCD array 22 have a size of 12 microns, then for a grating frequency $G = 24$, the distance T encompasses 63.67 pixels. For a grating frequency $G = 80$, the distance T encompasses 212.23 pixels. FIGS. 5 and 7 show the effect of illuminating the CCD array with the illuminating beam 66 directed normally upon both of the gratings 58 and 60, wherein the grating 58 is oriented along the X axis and the grating 60 is oriented along the Y axis. The crossed arrangement of the gratings 58 and 60 of FIG. 5 is the same arrangement as is employed in the construction of the grating assembly 56 of FIG. 1. However, in FIG. 1, the grating assembly 56 is illuminated by the two inclined beams 84 and 86, while, in FIG. 5 the two gratings 58 and 60 of the grating assembly 56 are illuminated, as noted above, by a single beam of light directed normally upon the gratings 58 and 60. In cooperation with the lens 26, the two gratings 58 and 60 diffract the incident light to form a diffraction pattern upon the front face of the CCD array in the manner depicted in FIG. 7 wherein peaks 108 of the diffraction pattern are arranged in a two-dimensional array of rows and columns. FIG. 7 shows the pattern produced in the situation wherein the grating frequency G is the same for both of the gratings 58 and 60. However, the grating frequency may differ between the two gratings 58 and 60, if desired, in which case the X and the Y dimensions of the diffraction pattern of FIG. 7 are unequal. As a result, the diffraction pattern is elongated in a direction parallel to the grating having the larger grating frequency.

Figure 8:
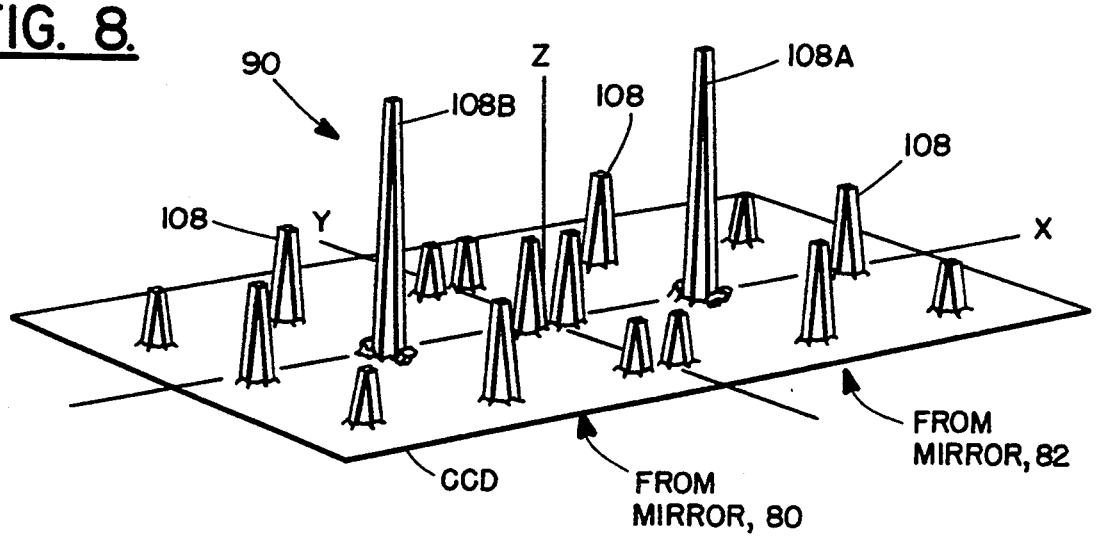
FIG. 8 shows a composite diffraction pattern obtained by illuminating the two perpendicularly-oriented gratings by two inclined beams of collimated light in FIG. 1.

With reference to FIGS. 1 and 8, the use of the two inclined beams 84 and 86 to illuminate the two crossed gratings 58 and 60 of the grating assembly 56 produces the aforementioned diffraction pattern 90 upon the front face of the CCD array 22, the diffraction pattern 90 being shown in further detail in the three-dimensional presentation of FIG. 8. A property of the Fourier transform optics which governs the generation of the diffraction pattern provides that an inclining of a beam of illuminating radiation relative to the optical axis 62, results in an offsetting of the resultant diffraction pattern. The amount of offset is proportional to the focal length of the lens 62, assuming that the array 22 is at the back focal plane 24, and is proportional also to the sine of the angle of inclination. By way of comparison with the illumination of the single beam of FIG. 5 incident normally upon the gratings 58 and 60, there results the aforementioned diffraction pattern of FIG. 7 which is centered upon the coordinate axes 88, and wherein the rows and columns are parallel to the X and the Y axes. If the illuminating beam were inclined, such as the first inclined beam 84, the resulting diffraction pattern would be similar to that of FIG. 7, but would be shifted to one side of the Z axis. For example, inclination of the first beam 84 in the X-Z plane to the right of the Z axis, as viewed in FIGS. 1 and 7, results in a shifting of the diffraction pattern of Fig. 7 to the left of the Z axis, as is shown in the left side of the diffraction pattern of FIG. 8. The use of two inclined beams of incident radiation, with one beam inclined to the right and the other beam inclined to the left, as in the case of the inclined beams 84 and 86 from the mirrors 80 and 82, respectively, results in two offset diffraction patterns, each offset pattern having a form similar to that of FIG. 7. The composite pattern of the two offset patterns produces the diffraction pattern 90 of FIGS. 1 and 8. The amount of offset depends on the amount of inclination. The beam splitting assembly 78 provides an amount of inclination which has been selected to displace the two diffraction patterns of FIG. 7 an amount such that, as shown in the plan view of the diffraction pattern 90 in FIG. 1, the right hand peaks 108 of the pattern deflected to the left coincide in location with the left hand peaks of the diffraction pattern which has been displaced to the right. The two peaks 108 in each window 106 of the center column of windows 106 of FIG. 1 are shown displaced slightly from the position of coincidence in order to show all of the peaks 108 of the various windows 106. FIGS. 9-14 show changes in the diffraction pattern resulting from a movement in the CCD array 22 from a desired aligned position, indicated in phantom at 22A, a direction of movement from the desired location 22A being indicated by an arrow 112 in each of the FIGS. 9-14. X, Y and Z axes of the coordinate axes 88 (FIG. 1) are also presented in FIGS. 9-14 to facilitate description of the movement of the array 22 from the desired location 22A. Such movements may be produced by manual manipulation of the array 22 during a manual alignment of the array 22 with the back focal plane 24 (FIG. 1), or during an automatic alignment of the array 22 by a feeding of electronic control signals to the mechanical adjustment device 42 (FIGS. 1 and 3). With reference also to FIG. 7, a movement of the array 22 away from the back focal plane 24 closer to, or further from, the grating assembly 56 reduces the sharpness of each of the peaks 108 to produce a more diffuse view of the peak 108. Furthermore, such movement acts to increase the overall dimensions of the diffraction pattern in the Y direction due to the converging array of light rays from the lens 26. However, in the X direction, the movement of the array 22 causes the two portions of the diffraction pattern 90, namely, the left portion centered about the peak 108B and the right portion centered about the peak 108A, to move towards each other because of the crossing of the beams 84 and 86 at the lens 26. The increase in size along the Y axis may be understood from FIG. 1 wherein the gratings 58 and 60 are substantially larger than the dimensions of the CCD array 22, this resulting in a general convergence of diffracted rays toward a minimum image size at the back focal plane 24, with subsequent enlargement and defocusing of the image beyond the back focal plane 24. In the event that only a portion of the array 22 were moved closer to the grating assembly 56 while another portion were moved away from the grating assembly 56, then there would be a composite of the forgoing effects. Therefore, displacement of peaks 108 from the centers of their respective windows 106 is an indication of movement, both translatory and rotational movement, of the array 22 from the desired position 22A. In the case of the diffraction pattern 90 (FIGS. 1 and 8), this being a composite of two of the diffraction patterns of FIG. 7, one constituting the left half of the pattern 90 and the other constituting the right half of the pattern 90, as described hereinabove, both the right and the left diffraction patterns may move relative to each other along the X axis and may undergo expansion or contraction along either or both of the X and the Y axes upon a rotation or translation of the array 22 from its designated position in the back focal plane 24. Specific changes in the pattern are described now with reference to FIGS. 9-14. The presentation of the diffraction pattern 90 in FIGS. 9-14 includes also the windows 106 as disclosed earlier in FIG. 1.

Figure 9:
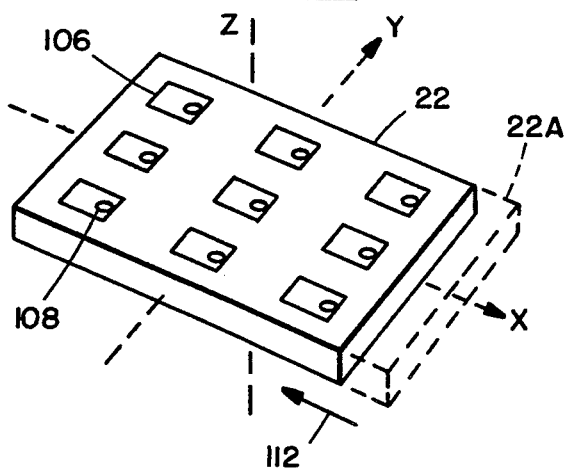
FIG. 9 shows distortion in the composite diffraction pattern of FIG. 8 due to movement of the CCD array from its designated location in the back-focal plane of the lens by displacement along the X axis.
Figure 10:
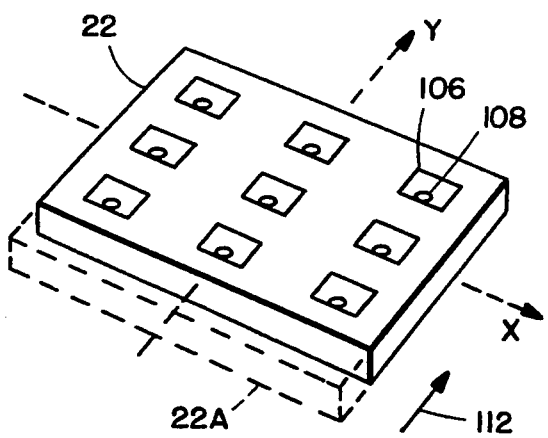
FIG. 10 shows distortion in the composite diffraction pattern of FIG. 8 due to movement of the CCD array from its designated location in the back-focal plane of the lens by displacement along the Y axis.

FIG. 9 shows displacement of the array 22 from a desired location 22A wherein the array 22 moves along the X axis to the left, as indicated by the arrow 112. As a result, the peaks 108 appear at the right sides of the windows 106 in all of the windows 106. In FIG. 10, the array 22 moves along the Y axis away from the desired location 22A in the positive Y direction (upwards in the view of FIG. 10). As a result, the peaks 108 move towards the bottom edges of the windows 106 in all of the windows 106.

Figure 11:
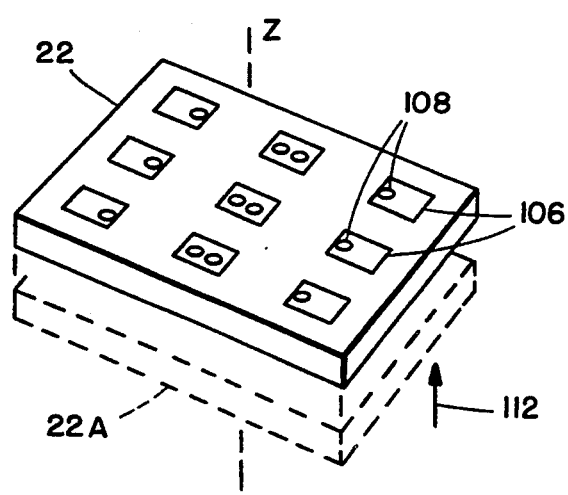
FIG. 11 shows distortion in the composite diffraction pattern of FIG. 8 due to movement of the CCD array from its designated location in the back-focal plane of the lens by displacement along the Z axis.

FIG. 11 demonstrates a movement of the array 22 from the desired location at 22A along the Z axis toward the grating assembly 56. The right and the left halves of the diffraction pattern move towards each other with the result that, in the central column of windows 106, the locations of the two peaks 108 in each window 106 diverge from coincidence. In the right hand column of windows, all of the peaks 108 migrate towards the left side of the windows 106. Similarly, in the left hand column of windows, all of the peaks 108 migrate towards the right side of the window 106. With respect to the central column of windows 106, while there is movement in the upper and lower windows 106, the peaks 108 move in opposite directions such that the centroid of the peaks 108 in each of these windows remains located along the Y axis. In the event that the array 22 were moved from the desired location 22A away from the grating assembly 56 (not shown), then the two halves of the diffraction pattern would move away from each other with the result that the peaks 108 in the right column of windows 106 would migrate to the right and the peaks 108 in the left column of windows 106 would move to the left.

Figure 12:
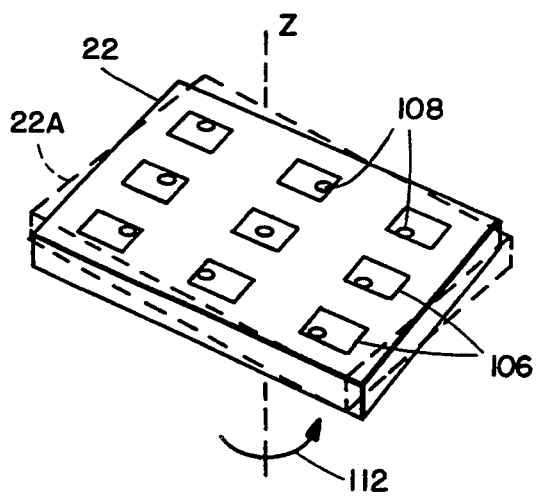
FIG. 12 shows distortion in the composite diffraction pattern of FIG. 8 due to movement of the CCD array from its designated location in the back-focal plane of the lens by rotation about the Z axis.

FIG. 12 demonstrates the situation wherein the array 22 is rotated about the Z axis from the desired location in 22A, the location being counterclockwise, by way of example, as indicated by the arrow 112. As a result, the peaks 108 in the right column moves towards the bottom edges of the windows 106, while the peaks 108 on the left sides move towards the upper edges of the windows 106. Movements are also found in the central column, as indicated in FIG. 12, except for the central window wherein the peak 108 is stationary. In the event of clockwise motion (not shown) of the array 22 from its desired location 22A, the apparent movement of the peaks 108 relative to their respective windows 106 would be the reverse of that shown in FIG. 12.

Figure 13:
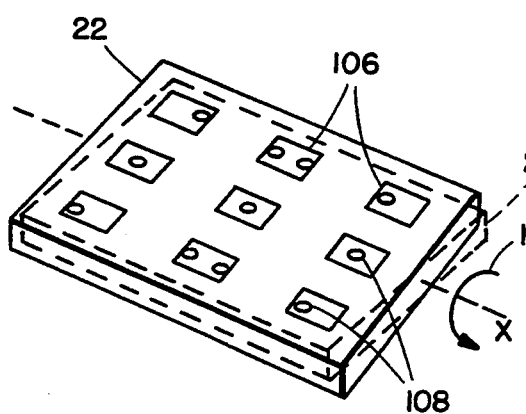
FIG. 13 shows distortion in the composite diffraction pattern of FIG. 8 due to movement of the CCD array from its designated location in the back-focal plane of the lens by rotation or tilting about X axis.
Figure 14:
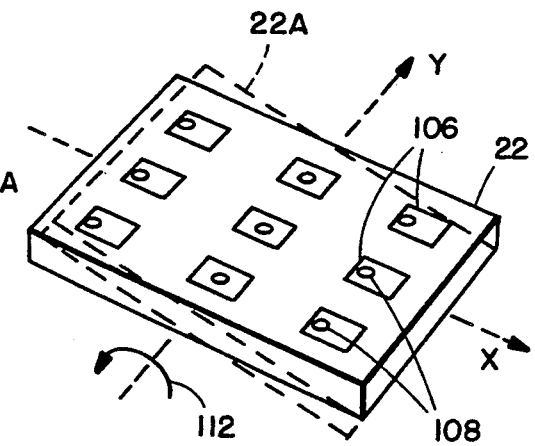
FIG. 14 shows distortion in the composite diffraction pattern of FIG. 8 due to movement of the CCD array from its designated location in the back-focal plane of the lens by rotation or tilt about the Y axis.
Figure 14A:
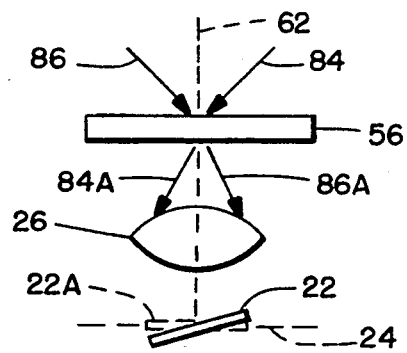
FIG. 14A shows a portion of FIG. 1 to demonstrate the tilting of the array of FIG. 14.

FIG. 13 shows rotation or tilting of the array 22 about the X axis from a desired location at 22A. As a result of the tilting, the top row of windows 106 is brought closer to the grating assembly 56, and the bottom row of windows 106 is brought more distant from the grating assembly 56. As a result, in the top row of the diffraction pattern, the peaks 108 from the two halves of the diffraction pattern move towards each other because of the crossed orientation of the beams 84 and 86 (FIG. 1). This results in a divergence from coincidence of the peaks 108 in the central window 106, and migration towards the left in the right window with migration to the right in the left window of the top row. In the middle row of windows 106 the peaks 108 remain centered. In the bottom row of the diffraction pattern, the peaks 108 from the two halves of the diffraction pattern move away from other resulting in a divergence from coincidence of the peaks 108 in the central window 106, and migration towards the right in the right window with migration to the left in the left window. With respect to the central column of windows 106, while there is movement in the upper and lower windows 106, the peaks 108 move in opposite directions such that the centroid of the peaks 108 in each of these windows remains located along the Y axis. The tilting in the reverse direction (not shown) of the array 22 produces the reverse movements of the peaks 108 in the respective windows 106. FIGS. 14 and 14A show rotation or a tilting of the array 22 about the Y axis from the desired location 22A, the rotation being in a counterclockwise direction as indicated by the arrow 112. To facilitate visualization of the tilting, FIG. 14A shows a portion of FIG. 1 providing further detail in the diffraction of the inclined beams 84 and 86 by the grating assembly 56 as they cross the axis 62 and continue in inclined fashion, as beams 84A and 86A, towards the lens 26 which then focuses these beams upon the array 22. The array 22, in both FIGS. 14 and 14A, is shown tilted from its desired orientation at 22A. There is no movement of the peaks 108 in the central column of windows 106, so that the centroids of the peaks 108 in the central column of windows 106 remain located along the Y axis. The rotation of the array 22 in the counterclockwise direction, as viewed in FIGS. 1, 14 and 14A, causes the array 22 to face generally in the direction of the beam 86A, and to be oriented with greater inclination relative to the beam 84A. As a result, the right side of the diffraction pattern 90 contracts, in the X direction, because it views the beam 86A with greater perpendicularity, while the left side of the diffraction pattern 90 expands, in the X direction, because it views the beam 84A with increased inclination. In both the right and the left columns of windows 106, there is expansion in the Y direction because of movement away from the back focal plane 24.

In the upper right window 106, the peak 108 moves to the left and towards the top of the window 106; and in the lower right window 106, the peak 108 moves to the left and towards the bottom of the window 106. In the upper left window 106, the peak 108 moves to the left and towards the top of the window 106; and in the lower left window 106, the peak 108 moves to the left and toward the bottom of the window 106. In the central row of windows 106, the peaks 108 of both the right and the left windows move to the left. Upon a tilting of the array 22 in the reverse direction (not shown) about the Y axis, there is a reversal of apparent motion of the peaks 108 relative to their respective windows 106 in the X coordinate such that the peaks move to the right in both the right and the left columns of windows 106.

With respect to any of the situations of FIGS. 9–14, the location of the centroid of illumination of each window 106 is readily determined by a suitably programmed computer. This is determined in accordance with well-known mathematical procedures wherein the magnitude of the signal of each pixel is multiplied by the coordinate of each pixel relative to a reference point in the window. Upon summing of the products and dividing by the sum of all of the pixel signals in the window, there is attained the value of one coordinate of the location of the centroid in the window; the process is repeated for the other coordinate to provide for two-dimensional location of the centroid in a window. The configurations of the various distorted diffraction patterns of FIGS. 9–14 are stored in memory of the pattern-recognition computer 96 (FIG. 1) to enable identification of the displacement or rotation of the array 22 from the desired location 22A. Small movements of the array 22, or combinations of the movements of FIGS. 9–14 can be stored in the computer 96 or may be calculated by suitable programming algorithms so as to develop correction signals for the adjustment device 42 to bring the array 22 into alignment with the desired position and orientation at 22A.

Figure 15:
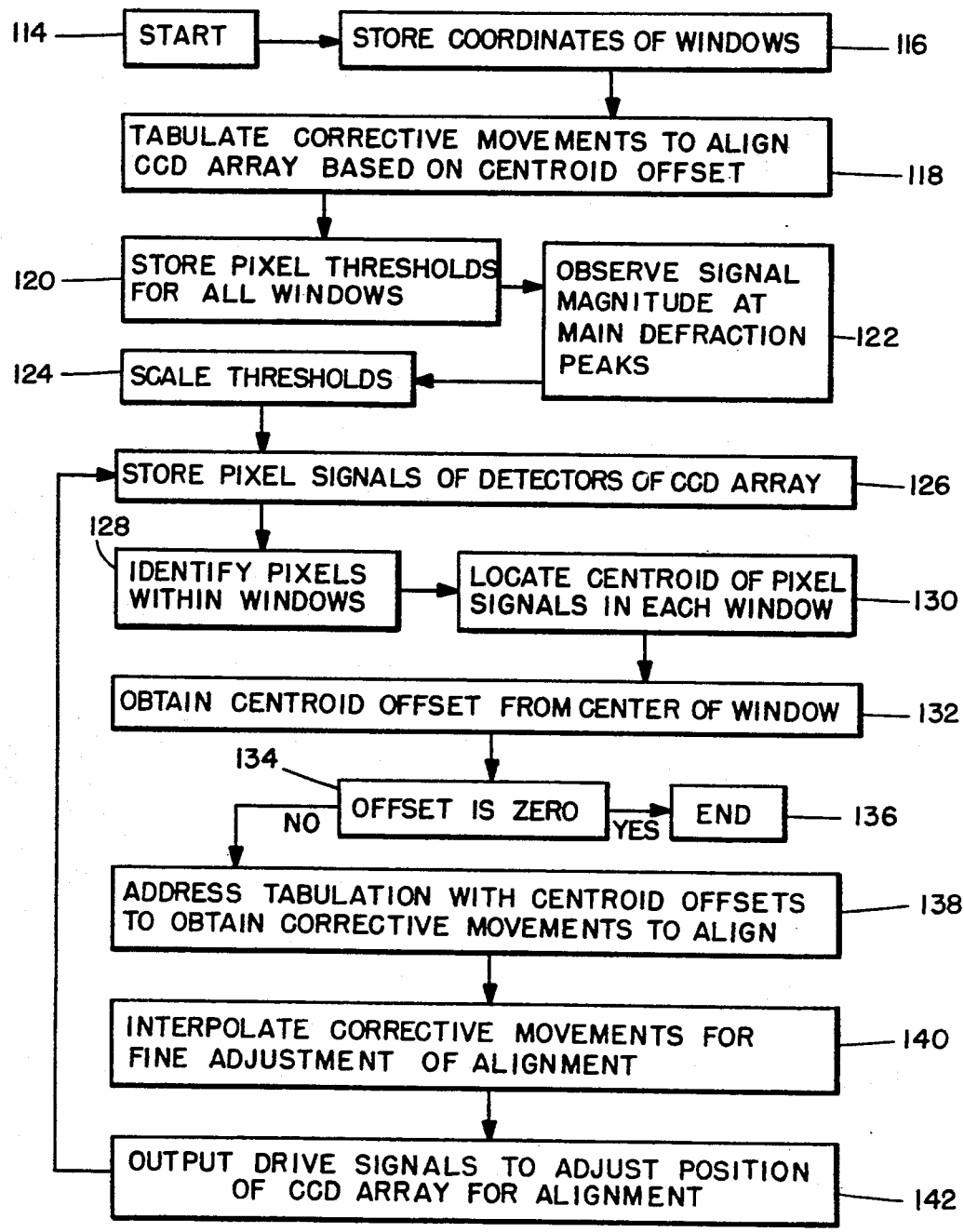
FIG. 15 is a flow chart showing operation of a pattern recognition computer of FIG. 1.

FIG. 15 is a flow chart useful in explaining operation of the pattern recognition computer 96, in conjunction with the controller 94, for directing movement of the adjustment device 42, and for setting values of threshold at the threshold unit 102. A program for the computer operation starts at block 114 and proceeds to block 116 for storing values of coordinates of the four corners of each of the windows 106. The windows 106 are presumed to have a rectangular shape; however, other shapes of window may be employed, if desired. This step prepares the computer for carrying forth the operation of the flow chart. A further preparatory step at block 118 provides a tabulation of corrective movements of the CCD array 22 for aligning the CCD array as a function of offset in the centroid of the peaks 108 from the center of each window 106, the tabulation providing for reference values of centroid offset. Also, preparatory for the operation, there is a storing of a reference set of threshold values at block 120 for operation of the threshold unit 102, there being a separate value of threshold for each of the windows 106. These reference threshold values are of nominal magnitude, and may be scaled upward or downward in the event that the optical signal is stronger or weaker than anticipated. Actual operation begins at block 122 with an observing of the magnitude of received pixel signals at a main peak, such as the peak 108A or 108B (FIGS. 1 and 8) of the diffraction pattern 90. At block 124 the program provides for a scaling of the threshold values to correspond with the actual magnitudes of the pixel signals. The pixel signals are stored in the memory 104 in accordance with their addresses, or locations, within the array 22. A gathering of data for use in the alignment process begins at block 126 with a storing of pixel signals from the numerous detectors of the CCD array 22, this storing being accomplished by the memory 104 as has been described hereinabove.

Identification of those pixels of the array which are located within the windows 106 is provided at block 128 by use of window data obtained at block 116. It is the set of pixels located within the windows 106 that are to be employed in generating the alignment signals for operation of the mechanical adjustment device 42. In order to generate error signals representative of a positional and/or orientation error for positioning the array 22, the centroid of each peak 108 is obtained, and the location of the centroid within a window, in terms of local X and Y coordinates of a window are obtained. Thus, at block 130, the operation provides for obtaining the X and the Y coordinates of the centroid of pixel signals within each of the windows. Then, at block 132, in each window the location of the centroid is compared with the location of the center of the window to obtain the actual offset of the centroid from the center of the window. This provides the form of data shown in FIGS. 9–14 wherein, in each of the windows 106, the centroid of the peak or peaks 108 within a window may be offset or centered within the respective windows.

The amount of offset noted at the various windows 106, as determined at block 132, is an indication of the amount and kind of displacement and/or orientation of the array 22 in accordance with the presentation of FIGS. 9–14. If, at block 134, the offset at each window is zero, then the array 22 is properly aligned, and the alignment procedure ends at block 136. However, if offsets are present, then the operation continues at block 138 by addressing the tabulation of block 118. The measured centroid offsets of block 132 serve as addresses for the tabulation to obtain the required corrective movements of the array 22 for alignment of the array 22 in the back focal plane 24 of the lens 26. Since the tabulation of block 118 provides for specific reference values of centroid offsets and the corresponding corrective movements, it may be desirable to interpolate between the specific reference values to obtain a more accurate amount of movement to be made. This interpolation is accomplished at block 140. Then, at block 142, the pattern-recognition computer 96 outputs appropriate drive signals to operate the mechanical adjustment device 42 to position the CCD array 22.

By way of example, the mechanical adjustment device 42, may be a robotic assembly having three axes and rotation about each of the three axes, thereby to accomplish the six elements of mechanical positioning outlined in FIGS. 9–14. In the event that two different forms of motion are required, such as a translation and a rotation, the computer 96 is able to interpolate between the error signals to establish the appropriate set of corrective signals. Thereafter, operation returns to block 126 to ascertain whether, in fact, the array 22 has been properly positioned at its alignment location. The process then continues from block 126 to block 134 and would terminate at block 136 in the event that there were no offset, this indicating proper alignment. However, in the event that still further adjustment of the alignment is required, as is made evident by a nonzero offset, then the operation would continue at block 138 to provide for further adjustment of the alignment.

Thus, the invention provides for alignment of a radiation-receptor, such as a CCD array in the back focal plane of lens, while the lens remains in its location in front of the CCD array. This enables construction of a sensor of an imaging system to be accomplished concurrently with an alignment process, with the lens and the light-receiving element located in their respective positions. Use of the sine wave gratings for producing the diffraction patterns permits use of automatic positioning apparatus, and also employs the lens of the sensor as an element of the alignment process for accurate convenient alignment.

It is to be understood that the above described embodiments of the invention are illustrative only, and that modifications thereof may occur to those skilled in the art. Accordingly, this invention is not to be regarded as limited to the embodiments disclosed herein, but is to be limited only as defined by the appended claims.

What is claimed is:

1. A method for aligning a photoreceptor with a lens comprising:
    locating the photoreceptor and a light source on opposite sides of said lens, and along an optical path extending through said lens;
    positioning a grating assembly on said optical path adjacent said lens;
    providing said grating assembly with a sinusoidal diffraction grating extending in a direction transverse to said optical path with an optical transmissivity which varies in a sinusoidal fashion;
    collimating light from said source to provide an illuminating light beam to illuminate said grating assembly to form a test diffraction pattern on said photoreceptor;
    comparing said test diffraction pattern to a reference diffraction to obtain an error pattern resulting from an error in alignment of said photoreceptor with said lens; and
    orienting said photoreceptor relative to said lens to null said error pattern.

2. A method according to claim 1 further comprising the step of:
    splitting said illuminating beam into a first beam and a second beam of collimated light which are angled relative to an optical axis of said lens, said first and said second beam illuminating said grating assembly to provide said test diffraction pattern as a pair of offset diffraction patterns on said photoreceptor.

3. A method according to claim 2 wherein said light source is a monochromatic light source, and said grating assembly comprises at least one sinusoidal diffraction grating extending in one dimension along an axis of said grating; and
    wherein said positioning of said grating assembly includes a step of aligning said grating axis with a plane defined by said first and said second beams.

4. A method according to claim 3 wherein said positioning step includes a positioning of said grating assembly on a side of said lens opposite said photoreceptor.

5. A method according to claim 3 wherein said grating assembly comprises two of said diffraction gratings, and said positioning includes a step of arranging said two gratings perpendicular to each other.

6. A method according to claim 5 wherein said photoreceptor is a two-dimensional array of photodetectors each of which outputs an electrical signal in response to incident light; and
    the method further comprises connecting imaging circuitry to said photodetectors, said comparing being performed electronically by said imaging circuitry.

7. A method according to claim 6 wherein said imaging circuitry provides for predetermined viewing areas including respective portions of said test diffraction pattern; and
    the method further comprises a step of establishing thresholds of light intensity at respective ones of said viewing areas.

8. Apparatus for aligning a photoreceptor with a back focal plane of a lens, comprising:
    light means and grating means disposed along an optical path extending through said lens, said photoreceptor being located on said optical path on a side of said lens opposite said light means, said light means directing a monochromatic collimated illuminating beam of light along said optical path toward said lens to illuminate said grating means to form a test diffraction pattern on said photoreceptor; and
    means for comparing said test diffraction pattern to a reference diffraction pattern to obtain an error patter resulting from an error in alignment of said photoreceptor with said lens, said error pattern indicating a corrective alignment movement of said photoreceptor relative to said lens to null said error pattern;

wherein said grating means comprises at least one sinusoidal diffraction grating extending in a direction transverse to said optical path with an optical transmissivity which varies in a sinusoidal fashion.

9. Apparatus according to claim 8 further comprising beam-splitting means positioned along said optical path between said light means and said grating means to split said illuminating beam into a first beam and a second beam inclined equally to an optical axis of said lens;

wherein said first beam and said second beam illuminate said grating assembly to provide said test diffraction pattern as a composition of a pair of offset diffraction patterns on said photoreceptor.

10. Apparatus according to claim 9 wherein said grating means has a periodicity extending along an axis of said grating and matching a wavelength of light from said light means, said grating axis lying in a plane defined by said first and second light beams.

11. Apparatus according to claim 10 wherein said grating means is located on a side of said lens opposite said photoreceptor.

12. Apparatus according to claim 10 wherein said grating means comprises two of said diffraction gratings arranged perpendicular to each other.

13. Apparatus according to claim 12 wherein said photoreceptor is a two-dimensional array of photodetectors each of which outputs an electrical signal in response to incident light; and said apparatus further comprises imaging circuitry connected to said photodetectors for providing said test diffraction pattern and said reference diffraction pattern to said comparing means.

14. Apparatus according to claim 13 wherein said imaging circuitry provides for predefined viewing areas including respective portions of said test diffraction pattern, said imaging circuitry being operative with thresholds of light intensity at respective ones of said viewing areas.

* * * * *

UNITED STATES PATENT AND TRADEMARK OFFICE
CERTIFICATE OF CORRECTION

PATENT NO. : 5,341,213
DATED : August 23, 1994
INVENTOR(S) : Giroux

It is certified that error appears in the above-indentified patent and that said Letters Patent is hereby corrected as shown below:

In column 14, line 47, "predetermined" should be --predefined--;
In column 15, line 21, delete the word "light".

Signed and Sealed this

Eighth Day of November, 1994

Attest:

BRUCE LEHMAN

Attesting Officer        Commissioner of Patents and Trademarks